United States Patent [19]

Deconinck

[11] Patent Number: 4,527,320

[45] Date of Patent: Jul. 9, 1985

[54] APPARATUS FOR LOADING PLANE FILM CASSETTES IN DAYLIGHT

[75] Inventor: Hugo F. Deconinck, Deurne-Zuid, Belgium

[73] Assignee: Agfa-Gevaert N.V., Mortsel, Belgium

[21] Appl. No.: 421,418

[22] Filed: Sep. 22, 1982

[30] Foreign Application Priority Data

Sep. 28, 1981 [GB] United Kingdom ............... 8129269

[51] Int. Cl.³ .............................................. B23B 7/06
[52] U.S. Cl. .................................. 29/33 R; 29/564.2; 29/806; 53/266 R; 83/167; 242/71.7
[58] Field of Search ............. 29/33 R, 417, 411, 806; 206/316, 578; 354/180, 181, 182, 211, 92; 242/71, 71.7; 83/167, 649; 225/40; 53/266 C; 493/396, 403; 271/198

[56] References Cited

U.S. PATENT DOCUMENTS

| | | | |
|---|---|---|---|
| 2,205,052 | 6/1940 | Stein | 242/71.7 |
| 3,132,573 | 5/1964 | Champlin et al. | 354/211 |
| 3,752,413 | 8/1973 | Caruso | 206/316 X |
| 3,762,252 | 10/1973 | Huger et al. | 83/167 X |
| 3,768,748 | 10/1973 | Pfefer | 242/71.7 |
| 3,829,035 | 8/1974 | Backscheider | 242/71.7 |
| 3,906,966 | 9/1975 | Drake et al. | 242/71.7 X |
| 4,018,033 | 4/1977 | Schmidt | 53/381 R |
| 4,198,009 | 4/1980 | Turner | 242/71.7 X |
| 4,391,082 | 7/1983 | Diesch | 53/266 C X |

Primary Examiner—William R. Briggs
Assistant Examiner—Glenn L. Webb
Attorney, Agent, or Firm—William J. Daniel

[57] ABSTRACT

An apparatus for daylight loading of a plane film cassette having at least one dark slide comprises a housing having an inlet opening through which the plane film cassette is introduced. In the interior of the housing is located a platform and an abutment member for aligning the cassette. Photographic material is supplied from a supply roll and cut in predetermined lengths. The cut off portion of the photographic material is partly guided into the plane film cassette, whereinafter a friction element engages the material length through the side opening of the cassette with the dark slide open and advances it completely into the plane film cassette which is subsequently closed, relocked and taken out of the housing.

9 Claims, 4 Drawing Figures

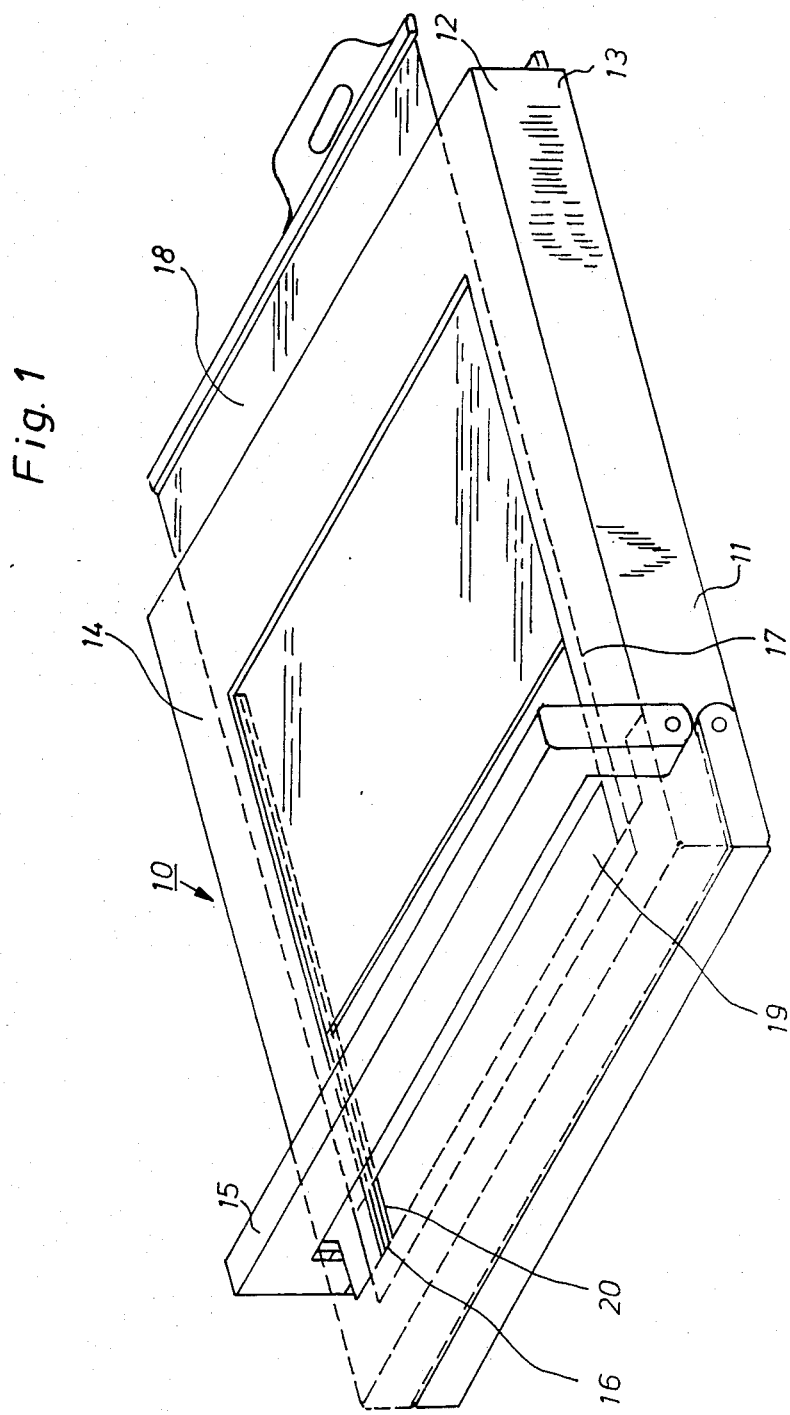

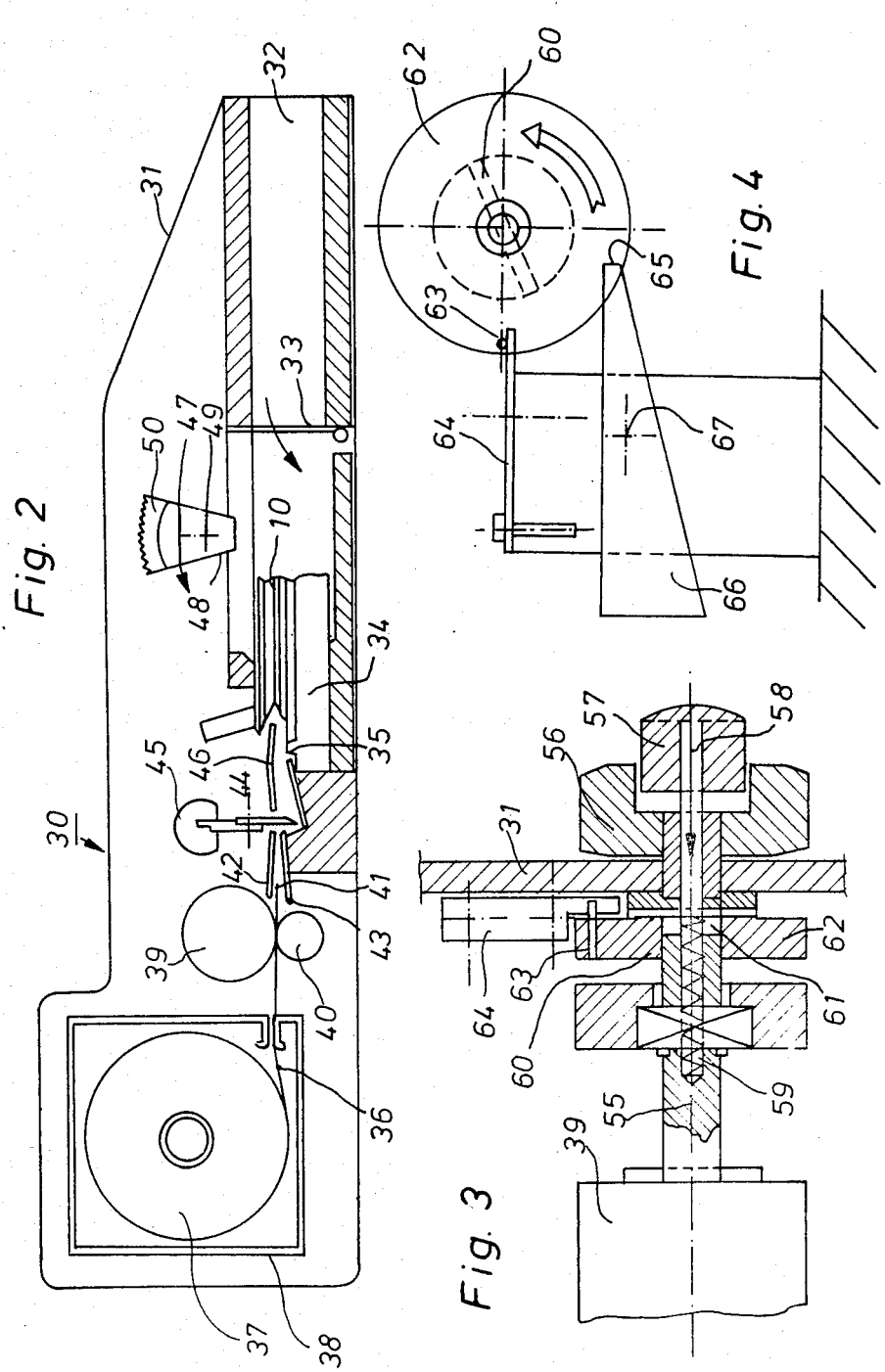

APPARATUS FOR LOADING PLANE FILM CASSETTES IN DAYLIGHT

This invention is concerned with the loading of plane film cassettes and more particularly with the loading of such cassettes in daylight conditions.

Plane film cassettes containing black and white or colour material are used in combination with view cameras which are extensively used by professional photographers. View cameras, the characteristics and applications of which are described in detail in "View Camera Technique" by Leslie Stroebel, Ed. The Focal Press, London-New York (1967), generally make use of photographic recording material of larger size than that used in roll film cameras. Such larger recording material is often in the form of rectangular film sheets which have to be preloaded into specially designed carriers which are positioned at the backside of the camera during exposure. These carriers, which are called plane film cassettes, are in the form of a shallow box closed by a so-called dark slide which is removed from the cassette after fitting the cassette to the camera and before the camera shutter is opened to expose the film sheet.

Plane films are also widely used in multiple objective cameras for making identity photographs. Multiple objective cameras have one or more pairs of objectives in order simultaneously to take a plurality of identical pictures of one subject.

Plane film cassettes find another application in the field of monitoring photography during which an image appearing on the fluorescent screen of a cathode ray tube is printed on a photographic material. Printing occurs generally on a reduced scale so that on one sheet of photographic material a plurality of images may be provided. Due to the spectral characteristics of the light emitted by the screen a large variety of photographic materials in sheet form, even X-ray films, are used.

Until now, e.g. a professional photographer had to pre-load, with unexposed film in a darkroom, as many cassettes as the number of photographs likely to be taken. A large number of such cassettes can be needed for some assignments. Such cassettes respresent a substantial investment on the part of the photographer, and their transportation from the photographer's premises to the place where the photographs are to be taken is sometimes a considerable inconvenience.

It is an object of the invention to provide an apparatus by means of which such plane film cassettes can be loaded in daylight or a room illuminated by normal artificial light. Given the facility of loading a cassette on site, the photographer will not need to use a large number of cassettes when also a device for unloading such cassette in well-lit conditions is at his disposition.

According to the invention, there is provided: Apparatus capable of loading plane film cassettes in daylight comprising:

a light-tight housing having an entrance which is fitted with a light-trap and via which an unlocked plane film cassette can be introduced into a loading position in such housing, a storage station in light-tight communication with the loading position for storing a roll of photographic material, delivery means operative for advancing a predetermined length of photographic material from storage station and for feeding that length partly into an unlocked plane film cassette when in loading position, cutting means for cutting the predetermined length from the roll of photographic material, and means for further advancing the cut length of photographic material into a position wholly within such cassette.

In a preferred embodiment the delivery means comprises an actuating member with associated stop means which restricts each operative movement of such member to an amount which advances said predetermined length of photographic material from the supply roll.

The delivery means comprises a transport friction roller which contacts the photographic material and which is rotated to a predetermined extent when the actuating member is moved operatively to the limit permitted by the associated stop means. The actuating member may be in the form of a hand-operated member connected to the friction roller so that a complete movement of said actuating member rotates the friction roller through 360°. In that case the periphery of the friction roller is equal to the length of the photographic material to be loaded. If, for reasons of compactness, the friction roller is kept small in diameter, the hand-operated member may be so designed that upon its actuation the transport friction roller is rotated two or more times through 360° in order to dispense a predetermined length of photographic material.

The means for further advancing the predetermined length of photographic material into an unlocked film cassette comprises a displaceable element which makes frictionally driving contact with a surface of the length of material. The displaceable element is preferably an element of sectoral form mounted for rotational movement. The friction surface of the displaceable element is resilient and has axially oriented grooves.

In addition to the transport friction roller the apparatus may incorporate fixed guides located between the roller and loading position in the housing.

In another preferred embodiment of the apparatus according to the invention, the storage station is constructed for holding a daylight type magazine containing a supply roll of photographic material thereby to permit such magazine to be removed from the housing and replaced.

In what follows, the term "photographic material" denotes every sheet materiaal which is sensitive to electromagnetic radiation and which yields monochrome or polychrome images after exposure and suitable processing. As such it comprises conventional black and white and colour materials, X-ray sensitive materials, etc. capable of being exposed in a plane film cassette as stated and provided on a flexible transparent or opaque support.

An apparatus according to the invention, selected by way of example will now be described with reference to the accompanying drawings, in which FIG. 1 is a perspective view of a plane film cassette, which can be loaded by means of an apparatus according to the invention, FIG. 2 is a longitudinal sectional view of an apparatus according to the invention, and FIGS. 3 and 4 are details of the apparatus of FIG. 2.

As may be seen in FIG. 1, a plane film cassette 10 comprises a shallow box 11 having an upper section 12 and an identical lower section 13 in which a photographic material (not shown) may be located. For the sake of simplicity, only the upper section 12 will be further described. The upper section 12 comprises a frame 14, bearing a hinged U-shaped element 15 at one extremity. When this element is in the position shown in solid lines, the section 12 is in unlocked condition, opening one end of the section for insertion of the photographic material. Along the sides of the frame 14, there are slotlike guides 16, 17 within which a so-called dark slide 18 is slidable.

When an exposure is to be made the plane film cassette 10 is fixed to the backside of the view camera (not shown) and the dark slide 18 is pulled out thereby to uncover the photosensitive coating of a photographic material (not shown) resting against back wall 19 and in guides 20 (at each side). After exposure the dark slide 18 is slid into its closed position and the U-shaped element 15 is swung into the broken line position, thereby locking the cassette before this is withdrawn from the camera.

FIG. 2 shows a longitudinal section of an apparatus according to the invention 30 intended for loading a plane film cassette 10 with photographic material.

The apparatus 30 comprises a housing 31 having an inlet opening 32 through which a plane film cassette 10 can be introduced. In order to provide for the light-tightness of the interior of the apparatus a resiliently biased light trap 33 masks the inlet opening 32. When a plane film cassette 10 is introduced through the inlet opening 32, the light trap 33 is displaced in the direction of the arrow and returns automatically to closed position after withdrawal of the cassette 10. Before its introduction into the apparatus 30, the plane film cassette 10 is unlocked (as illustrated in FIG. 1 in full lines) but the U-shaped element 15 is retained in its closed position by pushing it downward with the fingers when it passes through inlet opening 32. After passing of the latter the U-shaped element 15 assumes its open position automatically. The cassette is advanced over platform 34 until it is arrested by abutment member 35. A roll 37 of photographic material 36 is removably located in a holder or magazine 38 within housing 31. The magazine is of a so-called daylight type so that the pre-loaded magazine can be installed in the housing 31 under daylight conditions. The provision of photographic material in a light-tight cassette enables the photographer to switch to photographic material of another sensitivity or from black and white to colour materials.

The leading edge of the roll of photographic material 36 is guided between the nip of a pair of transport rollers 39 and 40 and into a guideway 41, formed by guide members 42 and 43.

One of the rollers 39, 40, preferably roller 39, has a peripheral extent which is equal to the length of photographic material 36 which is to be fed into the plane film cassette 10 so that an operator has to turn such roller 39 through one revolution in order to dispense exactly the required amount of photographic material. The dispensing movement of rollers 39, 40 causes the leading edge of the photograhic material to be advanced through a guideway 46 and into the unlocked end of the plane film cassette. After this dispensing movement of rollers 39 and 40 the photographic material is cut by means of knife 44 which moves transversally across the photographic material 36 thereby separating a length of photographic material from the rest of the roll 37. The knife 44 as illustrated here is fixed to a bar 45 which is moved in a direction normal to the plane of the drawing either by hand or by means of a motor.

Due to the distance between the leading edge of the plane film cassette 10 and the knife 44 a small portion (equal to that distance) of photographic material 36 still protrudes out of the cassette. In order further to advance the material so that it fully enters the cassette a friction element 47 is provided.

The friction element 47 is in the form of a sector 48 which is rotatebly carried by a shaft 49 and has its peripheral surface formed by a layer or coating 50 of friction-enhancing material. In a practical embodiment, this coating or material is rubber in which small axially extending surface grooves are provided. Upon rotation of the friction element 47 with the dark slide 18 in open position, the grooved surface contacts a face of the photographic material 36 and advances it completely into the unlocked plane film cassette 10. The rotation of friction element 47 may be carried out by hand or with the help of a motor. After the entire cut length of the photographic material 36 has entered the plane film cassette 10, the latter is removed from the apparatus 30 after closing and locking. Closing occurs during withdrawal of the cassette 10 from the apparatus 30 which causes the U-shaped element 15 to be pushed down, whereafter the dark slide 18 (see FIG. 1) is pushed in forward direction so that it mates with the guides provided on the edges of said element, thereby locking the cassette.

The extent to which the photographic material is advanced by the movement of the transport rollers 39 and 40 is critical because this determines the length of material which will be cut from the roll. Therefore stop means is provided for limiting the movement of such rollers in each dispensing cycle. In the particular apparatus illustrated, one of the transport rollers 39-40 has a peripheral extent equal to the length of photographic material 36 to be dispensed and stop means is provided for locking the rotation of that roller on completion of one revolution.

Details of the locking mechanism are illustrated in FIGS. 3 and 4.

As can be seen from FIGS. 3 and 4, dispensing roller 39 is mounted on a hollow shaft 55 which can be rotated by turning an attached knob 56 located at the outside of housing 31. In a recess of knob 56, there is a push-button 57 which is carried by a spindle 58. This spindle is axially displaceable within the hollow shaft 55 against the bias of a spring 59.

The spindle 58 carries a retaining pin 60 which projects through an axially extending slot 61 in shaft 55. When push-button 57 is depressed, pin 60 bears against and axially displaces a disc 62, which is slidably mounted on the shaft 55. The disc 62 carries a pin 63 which by displacement of the disc is moved clear of a stop 64 which may be in the form of a spring. The knob 56 is thereby released for rotation in the direction indicated by the arrow in FIG. 4. When rotation has started, the push-button 57 is released and the rotation of the knob is arrested on completion of one revolution by abutment of the pin 63 against stop 64.

The disc 62 is also provided with a detent 65 into which a second blocking element 66 engages, so that accidental rotation of the transport rollers in the opposite direction is also prevented. The element 66 is pivoted at 67 so that it does not prevent rotation of the knob 56 in the direction of the arrow.

Although in the foregoing a manual version of a plane film cassette loading apparatus is illustrated and described, it will be clear to the skilled worker that the mechanisms described hereinbefore may be easily adapted for incorporation in an automatic system of which the loaded plane film cassette forms part. So, if required, the apparatus may be incorporated e.g. in a console for monitoring photography without requiring substantial modifications of the loading mechanism for plane film cassettes as described and claimed.

We claim:

1. Apparatus for daylight loading plane film cassettes having a central panel for supporting on at least one surface thereof a light sensitive film sheet with the light sensitive side facing outwardly, peripheral flanges rigid with said central panel for overlying the margins of each such supported sheet, slots in said flanges spaced from said central panel for slidably receiving a dark slide parallel with said panel and the film sheet thereon which can be slidably displaced to open the side of the cassette for exposure of the outwardly facing light-sensitive side of said film sheet, and openable closure means for one end flange through which when open, the sheet can be inserted into and removed from said cassette, said apparatus comprising:

- a light-tight housing having an entrance which is fitted with a light-trap and via which said plane film cassette can be introduced into a loading position in said housing with the dark slide on at least one side of said cassette displaced to at least partially open said cassette side and with said closure means open,
- a storage station in light-tight communication with said loading position for storing a supply roll of photographic material,
- delivery means operative for advancing a predetermined sheet-size length of photographic material from said storage station and for inserting said length through said open end flange and under side flanges partly into the open plane film cassette while in said loading position,
- cutting means for cutting said predetermined length from said roll of photographic material, and
- means insertable through the thus at least partially opened side of said cassette at an angle to the plane of said sheet to engage the outwardly facing side of said partly inserted film sheet and for further advancing said predetermined length of photographic material into a position wholly within such cassette.

2. Apparatus according to claim 1, wherein said delivery means comprises an actuating member with associated stop means which limits each operative movement of such member to an extent which advances said predetermined length of photographic material from said roll.

3. Apparatus according to claim 2, wherein said delivery means includes a film transport friction roller external of said cassette which contacts the photographic material and which is rotated to a predetermined extent when said actuating member receives an operative movement to the limit determined by said stop means.

4. Apparatus according to claim 3, wherein said actuating member is a hand-operated member connected to said friction roller and a complete movement of said actuating member rotates said friction roller through 360°.

5. Apparatus according to claim 1, in which said means for further advancing the partially inserted length of photographic material into said film cassette comprises a movable element disposed adjacent one side of said cassette and displaceable through said at least partially open side of said cassette angularly of said film into frictional driving contact with said outwardly facing side of said film sheet accessible through said dark slide is open.

6. Apparatus according to claim 5, in which said displaceable element is an element of sectional form mounted for rotary movement about an axis in spaced parallel relation to the plane of the film sheet.

7. Apparatus according to claim 5, in which the friction surface of said displaceable element is resilient and has axially oriented grooves.

8. Apparatus according to claim 1, wherein said delivery means includes a friction roller which contacts the photographic material between the supply roll and the open end flange of said cassette and fixed guides located between such roller and said loading position in said housing.

9. Apparatus according to claim 1, wherein the storage station is constructed for holding a daylight magazine containing said supply roll of photographic material and permitting such magazine to be removed from the housing and replaced.

* * * * *